(12) United States Patent
Waldron et al.

(10) Patent No.: US 12,146,543 B2
(45) Date of Patent: Nov. 19, 2024

(54) AUTOMATED DECOUPLING SHOCK ISOLATION FOR VIBRATION COUPLERS

(71) Applicant: Raytheon Company, Tewksbury, MA (US)

(72) Inventors: Ashley Waldron, Tucson, AZ (US); Brian Hochheim, Tucson, AZ (US); Stephane Joubert, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 18/497,408

(22) Filed: Oct. 30, 2023

(65) Prior Publication Data

US 2024/0060542 A1    Feb. 22, 2024

Related U.S. Application Data

(62) Division of application No. 17/346,206, filed on Jun. 12, 2021, now abandoned.

(51) Int. Cl.
*G01M 7/02* (2006.01)
*F16F 1/373* (2006.01)

(52) U.S. Cl.
CPC ............ *F16F 1/3735* (2013.01); *G01M 7/02* (2013.01); *F16F 2224/025* (2013.01);
(Continued)

(58) Field of Classification Search
CPC ............ F16F 1/3735; F16F 2224/025; F16F 2226/045; F16F 2230/0005;
(Continued)

(56) References Cited

U.S. PATENT DOCUMENTS 3,074,269 A    1/1963    Wohl
3,762,694 A    10/1973    Mac
(Continued)

FOREIGN PATENT DOCUMENTS

DE    29915756    11/1999
WO    2022260773    12/2022

OTHER PUBLICATIONS

"U.S. Appl. No. 17/346,206, Final Office Action mailed Jul. 28, 2023", 9 pgs.
(Continued)

*Primary Examiner* — Xuan Lan Nguyen
(74) *Attorney, Agent, or Firm* — Schwegman Lundberg & Woessner, P.A.

(57) ABSTRACT

A shock isolator is arranged between two automated coupler parts in a vibration testing unit. When the coupler parts are engaged and coupled during vibration testing of a component, the shock isolator is disabled, and when the coupler parts are disengaged and decoupled after vibration testing, the shock isolator is activated to absorb excess shock energy and prevent shock transfer between the coupler parts that would damage the test component. The shock isolator includes a bushing that is inserted in a lower part of the two automated coupler parts and a compressive fit rod that is press-fit into the bushing. The bushing has a chamfered volume and the compressive fit rod has a corresponding compressible volume that is displaced into the chamfered volume to disable the shock isolator. After vibration testing, the compressive fit rod is expandable to a regular shape to activate the shock isolator.

19 Claims, 4 Drawing Sheets

(52) U.S. Cl.
CPC . *F16F 2226/045* (2013.01); *F16F 2230/0005* (2013.01); *F16F 2236/04* (2013.01)

(58) Field of Classification Search
CPC ...... F16F 2236/04; G01M 7/02; G01M 7/022; G01M 7/04; G01M 7/08
USPC .................................................. 73/571, 663
See application file for complete search history.

(56) References Cited

U.S. PATENT DOCUMENTS

| | | | |
|---|---|---|---|
| 4,633,716 | A | 1/1987 | Martin |
| 6,296,237 | B1 | 10/2001 | Nagai |
| 6,572,088 | B2 | 6/2003 | Tadano et al. |
| 7,735,812 | B2 | 6/2010 | Fitzgerald |
| 8,939,437 | B2 | 1/2015 | Kobori |
| 9,696,236 | B1 | 7/2017 | Berto et al. |
| 9,829,063 | B2 | 11/2017 | Cho et al. |
| 10,106,317 | B2 | 10/2018 | Keay |
| 10,408,264 | B2 | 9/2019 | Papic et al. |
| 2017/0045110 | A1 | 2/2017 | Zielinski et al. |
| 2022/0397174 | A1 | 12/2022 | Waldron et al. |

OTHER PUBLICATIONS

"U.S. Appl. No. 17/346,206, Advisory Action mailed Oct. 13, 2023", 3 pgs.
"U.S. Appl. No. 17/346,206, Preliminary Amendment filed Jun. 12, 2021", 6 pgs.
"U.S. Appl. No. 17/346,206, Restriction Requirement mailed Jan. 19, 2023", 7 pgs.
"U.S. Appl. No. 17/346,206, Response filed Mar. 6, 2023 to Restriction Requirement mailed Jan. 19, 2023", 1 pg.
"U.S. Appl. No. 17/346,206, Non Final Office Action mailed Apr. 17, 2023", 8 pgs.
"U.S. Appl. No. 17/346,206, Examiner Interview Summary mailed May 5, 2023", 2 pgs.
"U.S. Appl. No. 17/346,206, Response filed Jul. 17, 2023 to Non Final Office Action mailed Apr. 17, 2023", 10 pgs.
"U.S. Appl. No. 17/346,206, Examiner Interview Summary mailed Aug. 28, 2023", 2 pgs.
"U.S. Appl. No. 17/346,206, Response filed Sep. 28, 2023 to Final Office Action mailed Jul. 28, 2023", 7 pgs.
"International Application Serial No. PCT US2022 026705, International Preliminary Report on Patentability mailed Dec. 21, 2023", 8 pgs.
International Search Report and Written Opinion mailed Sep. 6, 2022, for International Patent Application No. PCT/US2022/026705.

AUTOMATED DECOUPLING SHOCK ISOLATION FOR VIBRATION COUPLERS

RELATED APPLICATION

This application is a divisional application of U.S. application Ser. No. 17/346,206, filed Jun. 12, 2021, which is hereby incorporated herein by reference in its entirety.

FIELD OF DISCLOSURE

The disclosure relates to a shock isolator for a vibration testing unit.

DESCRIPTION OF RELATED ART

Various applications use vibration testing for components that will be subject to vibrations during normal operation. For example, hardware, circuit card assemblies including stacks of circuit cards, and other subsystem level units may be subject to random vibrations, harmonic vibrations, and controlled shock profiles when implemented in a particular environment. Exemplary environments in which the components may be subject to vibrations include moving platforms such as aircrafts, missiles, spacecrafts or satellites, sea vessels, land vehicles, etc.

Vibration testing may include automated coupling and decoupling of components with a vibration testing unit utilizing a conventional coupler which includes an upper coupler part and a lower coupler part. After the vibration testing, the parts are disengaged and decoupled from the vibration testing unit, but the environment imparted on the parts during the decoupling may not be benign. The pressure applied to decouple the upper and lower coupler parts may cause the upper coupler part to rapidly accelerate upwardly and then downwardly relative to the lower coupler part such that the upper coupler part hits the lower coupler part and causes a significant shock. Conventional couplers may not be sufficient in preventing shock transfer between the upper and lower coupler parts during decoupling, such that the shock occurring during decoupling may exceed the shock specifications for the particular component that is subject to the vibration testing. Consequently, the test component may be damaged by the excess shock.

SUMMARY OF DISCLOSURE

The present application provides shock isolation for a vibration testing unit that includes an automated coupler. The shock isolator is arranged between two automated coupler parts. When the coupler parts are engaged and coupled during vibration testing of a component, the shock isolator is disabled due to compression. When the coupler parts are disengaged and decoupled after vibration testing, the shock isolator is expanded and can absorb excess shock energy and prevent shock transfer between the coupler parts that may damage the test component.

Each shock isolator includes a bushing that is inserted in the lower coupler part and a compressive fit rod that is press-fit into the bushing. The compressive fit rod is formed of an elastomeric material that is able to be repeatedly compressed and expanded without permanent deformation. The bushing has a chamfered volume and the compressive fit rod has a corresponding compressible volume that is displaced into the chamfered volume to disable the shock isolator when the coupler parts are engaged. After vibration testing, the coupler parts are disengaged and the compressive fit rod expands to its decompressed shape to activate the shock isolator and absorb the excess shock energy.

Incorporating the shock isolator into an automated coupler is advantageous in that the shock isolator does not change the overall vibration performance of the test environment when the compressive fit rod is compressed inside the bushing. The shock isolator is effectively shorted out when the coupler parts are engaged during vibration testing. The compressive fit rod has a predetermined durometer and a lower portion of the compressive fit rod is press-fit into the bushing. The upper portion of the compressive fit rod is a compressive volume that is deformed during coupling. An axial length of the compressible volume may be less than ten percent of the total axial length of the compressive fit rod which enables the compression profile of the compressive fit rod to be linear.

According to an aspect of the disclosure, an automated coupler may include one or more shock isolators arranged between the two coupler parts.

According to an aspect of the disclosure, an automated coupler may include a shock isolator that is disabled during coupling of the two automated coupler parts and activated when the two automated coupler parts are decoupled to absorb excess shock energy.

According to an aspect of the disclosure, a shock isolator may include a bushing and a compressive fit rod inserted in the bushing.

According to an aspect of the disclosure, a shock isolator may include a bushing and a compressive fit rod that is deformable inside the bushing to disable the shock isolator when two automated coupler parts are coupled during vibration testing.

According to an aspect of the disclosure, a shock isolator may include a bushing having a chamfered volume and a compressive fit rod having a corresponding compressible volume that fits inside the chamfered volume.

According to an aspect of the disclosure, a shock isolator may include a bushing and a compressive fit rod having a compressible volume that is the only portion of the compressive fit rod deformable inside the bushing.

According to an aspect of the disclosure, a shock isolator is arranged between coupler parts in an automated coupler and includes a bushing, and a compressive fit rod supported in the bushing, the compressive fit rod being compressible inside the bushing to disable the shock isolator when the coupler parts are coupled during vibration testing, the compressive fit rod being expandable outwardly from the bushing to activate the shock isolator and absorb excess shock energy when the coupler parts are decoupled.

According to an embodiment of any paragraph(s) of this summary, the bushing may define a chamfered volume and the compressive fit rod may have a compressible volume that is equivalent to the chamfered volume, wherein the chamfered volume is filled by the compressive fit rod when the compressive fit rod is deformed during compression.

According to an embodiment of any paragraph(s) of this summary, the chamfered volume may be defined by a tapered surface that tapers radially inwardly from a radial mating surface of the bushing.

According to an embodiment of any paragraph(s) of this summary, the radial mating surface may be an upper surface of the bushing that engages an upper coupler part of the coupler parts.

According to an embodiment of any paragraph(s) of this summary, the tapered surface may extend an axial distance that is less than half of an entire axial length of the bushing.

According to an embodiment of any paragraph(s) of this summary, the tapered surface may be angled by between ten and 20 degrees relative to a longitudinal axis of the shock isolator.

According to an embodiment of any paragraph(s) of this summary, the compressive fit rod may have a compressible volume that is deformed during compression and has an axial length that is ten percent or less of a total axial length of the compressive fit rod.

According to an embodiment of any paragraph(s) of this summary, the compressible volume may be an uppermost portion of the compressive fit rod.

According to an embodiment of any paragraph(s) of this summary, the compressive fit rod may be press-fit into the bushing.

According to an embodiment of any paragraph(s) of this summary, the compressive fit rod may have a compressive fit with the bushing that is ten percent or less.

According to an embodiment of any paragraph(s) of this summary, the compressive fit rod may define an axially-extending through-aperture.

According to an embodiment of any paragraph(s) of this summary, the bushing may define a radial seat against which an axial end of the compressive fit rod is supported.

According to an embodiment of any paragraph(s) of this summary, the compressive fit rod may be formed of an elastomeric material having a durometer between 40 and 70.

According to an embodiment of any paragraph(s) of this summary, the compressive fit rod may be formed of a urethane material.

According to an embodiment of any paragraph(s) of this summary, the bushing may be formed of a thermoplastic polymer material.

According to an embodiment of any paragraph(s) of this summary, an upper portion of the compressive fit rod may be compressed inside an upper portion of the bushing when in a compressed position, and wherein the upper portion expands upwardly and outside of the bushing to an expanded position which corresponds to a decompressed or normal shape of the compressive fit rod.

According to another aspect of the disclosure, a vibration testing unit includes an upper coupler part and a lower coupler part that are coupled during vibration testing and decoupled after the vibration testing, and a plurality of shock isolators arranged in the lower coupler part between the upper coupler part and the lower coupler part, each of the plurality of shock isolators including a bushing and a compressive fit rod supported in the bushing, the compressive fit rod being compressible to a compressed position in which the compressive fit rod is compressed inside the bushing to disable the plurality of shock isolators when the upper coupler part and the lower coupler part are coupled during vibration testing, the compressive fit rod being expandable to an expanded position in which the compressive fit rod expands outwardly from the bushing to activate the plurality of shock isolators and prevent shock transfer when the upper coupler part and the lower coupler part are decoupled.

According to still another aspect of the disclosure, a method of vibration testing includes press-fitting a compressive fit rod into a bushing to form a shock isolator, inserting one or more shock isolators into a lower coupler part of two automated coupler parts between the lower coupler part and an upper coupler part of the two automated coupler parts, coupling the two automated coupler parts during vibration testing and decoupling the two automated coupler parts after the vibration testing, compressing an upper portion of the compressive fit rod inside the bushing to disable the one or more shock isolators during the vibration testing, and expanding the upper portion of the compressive fit rod upwardly from and outside the bushing to activate the one or more shock isolators and prevent shock transfer when the two automated coupler parts are decoupled.

According to an embodiment of any paragraph(s) of this summary, compressing the upper portion of the compressive fit rod may include filling a chamfered volume formed in an upper portion of the bushing and expanding the upper portion of the compressive fit rod includes removing the compressive fit rod from the chamfered volume.

According to an embodiment of any paragraph(s) of this summary, compressing the upper portion of the compressive fit rod may include compressing a compressible volume of the compressive fit rod that has an axial length of the compressive fit rod that is ten percent or less of a total axial length of the compressive fit rod.

To the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description when considered in conjunction with the drawings.

BRIEF DESCRIPTION OF DRAWINGS

The annexed drawings, which are not necessarily to scale, show various aspects of the disclosure.

DETAILED DESCRIPTION

The principles described herein have application in vibration testing units and methods of vibration testing. A vibration testing unit includes two automated coupler parts that are engaged together and coupled during vibration testing of a component and decoupled after the vibration testing. Vibration testing may occur in an enclosed automated system in which there is no manual operation or human interaction. The vibration testing unit described herein may be used for any suitable component that is subject to vibration during normal operation. When implemented in a moving platform during normal operation, such as an aircraft, missile, spacecraft or satellite, sea vessel, land vehicle, etc., the component may be subject to random vibrations, harmonic vibrations, or controlled shock profiles depending on the environment. Exemplary components that may undergo vibration testing prior to operation include hardware components, circuit card assemblies, stacks of circuit cards, and other subsystem level units.

Figure 1:
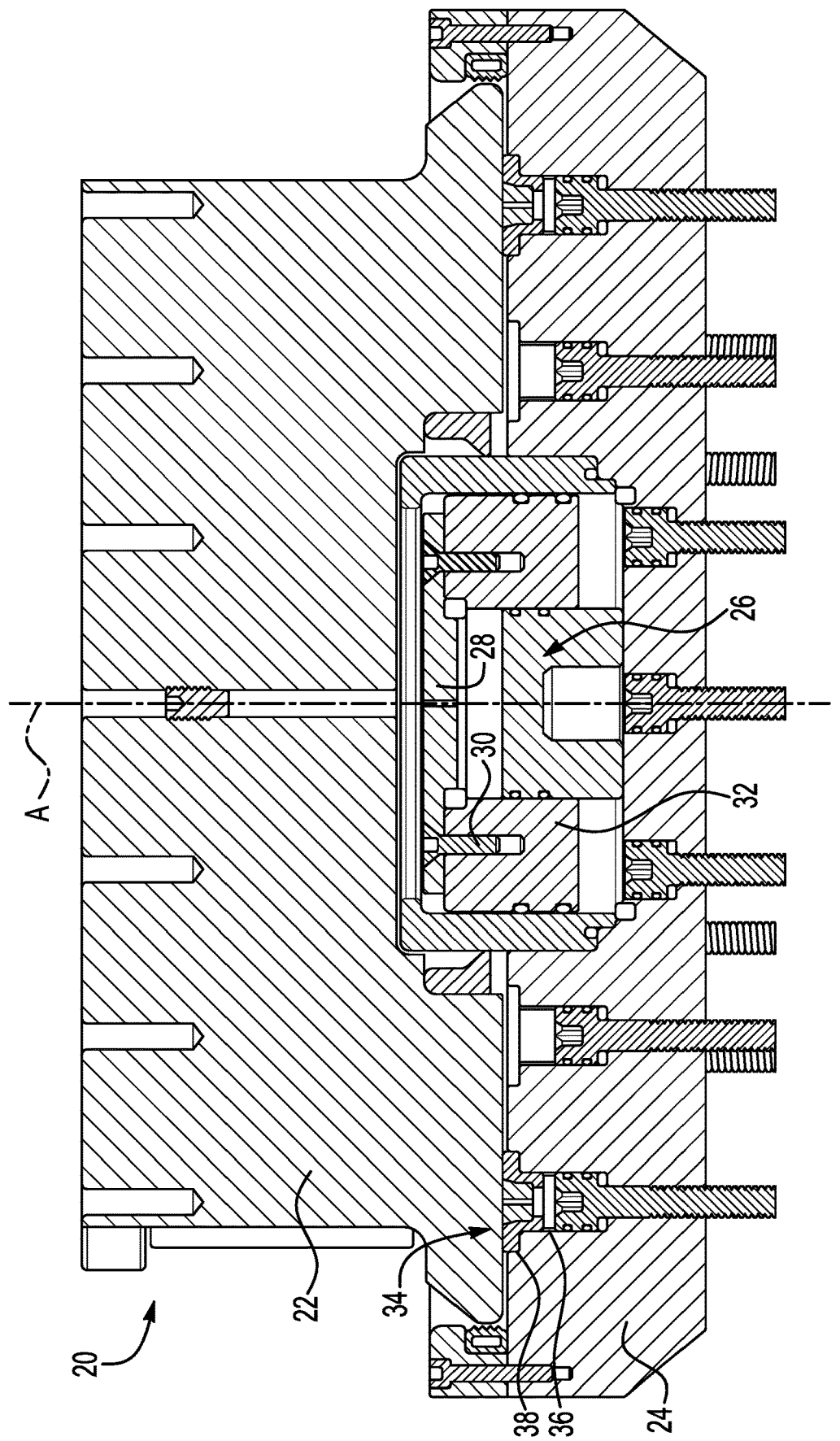
FIG. 1 shows a vibration testing unit having shock isolators interposed between two automated coupler parts.
Figure 2:
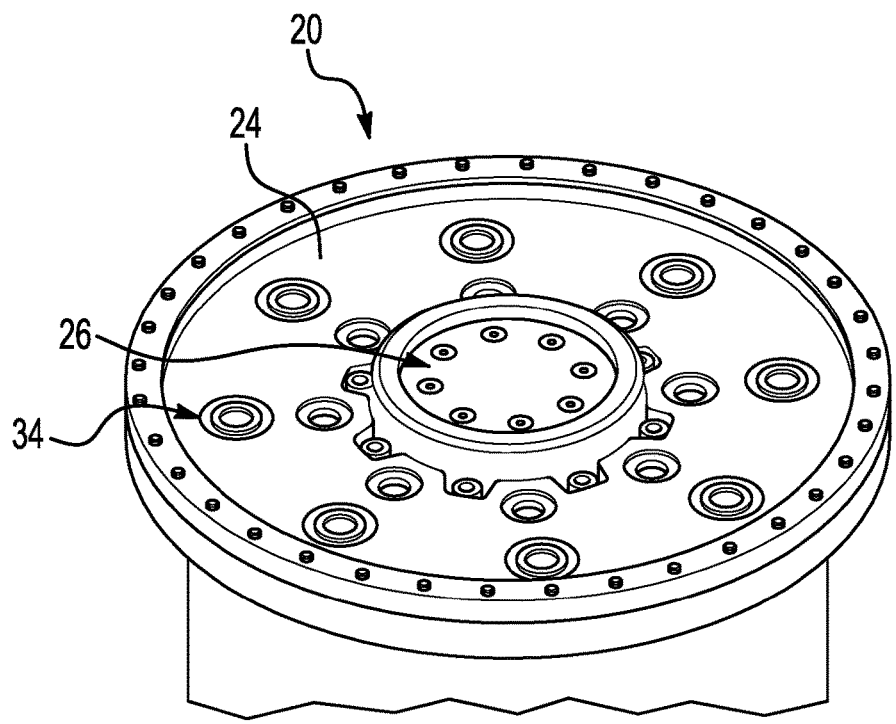
FIG. 2 shows the shock isolator assembled in a lower part of the two automated coupler parts of FIG. 1.

Referring first to FIGS. 1 and 2, a vibration testing unit 20 for any suitable component is shown. The vibration testing unit 20 includes two automated coupler parts 22, 24 having an upper coupler part 22 and a lower coupler part 24 that are engageable with each other. FIG. 2 shows a top view of the lower coupler part 24 with the upper coupler part 22 removed. An interior area 26 is arranged along a central axis A of the vibration testing unit 20 within the vibration testing unit 20. The interior area 26 is enclosed between the two automated coupler parts 22, 24 when the vibration testing unit 20 is assembled. A component 28 is received and supported in the interior area 26 for automated vibration testing performed by the vibration testing unit 20. The interior area 26 may be shaped and sized to accommodate any suitable component. Any suitable fasteners 30 or other support mechanisms 32 may be used to support and accommodate the component 28. The vibration testing unit 20 may have many different configurations depending on the component or components to be tested.

During vibration testing of the component 28, the upper coupler part 22 and the lower coupler part 24 are engaged and coupled together. After the vibration testing, the upper coupler part 22 and the lower coupler part 24 are disengaged and decoupled using a suitable pneumatic device that exerts a positive pressure on the vibration testing unit 20. One or both of the automated coupler parts 22, 24 may be movable towards and away from each other for coupling and decoupling, respectively. The automated coupler parts 22, 24 may be movable in an axial direction along the central axis A of the vibration testing unit 20. In exemplary embodiments, the lower coupler part 24 may always remain stationary and the upper coupler part 22 may move downwardly toward the lower coupler part 24 for coupling during vibration testing and upwardly away from the lower coupler part 24 to disengage the lower coupler part 24 for decoupling. The coupling and decoupling operation may be automated in that the movement of the automated coupler parts 22, 24 may be preset or automated.

The vibration testing unit 20 includes one or more shock isolators 34 that are arranged between the upper coupler part 22 and the lower coupler part 24. The lower coupler part 24 may be formed to have one or more apertures 36 configured to receive a corresponding one of the shock isolators 34. The apertures 36 are sized and shaped to correspond to the size and shape of the shock isolators 34 so that the shock isolators 34 are matingly engageable within the apertures 36. Each of the apertures 36 may be formed to have a radial surface that defines a seat 38 configured to engage with and support the shock isolator 34 when the shock isolator 34 is inserted into the lower coupler part 24.

Any number of shock isolators 34 may be provided and the shock isolators 34 may be uniform in terms of size and shape. The number of shock isolators 34 may be selected depending on the amount of mating surface area between the shock isolators 34 and the upper coupler part 22 which is assembled over the shock isolators 34 when inserted into the apertures 36 of the lower coupler part 24. For example, the number of shock isolators 34 may be increased if the amount of mating surface area is increased. The number of shock isolators 34 may also be selected depending on the amount of pressure applied during decoupling to ensure that the shock isolators 34 are able to activate. Between six and ten shock isolators 34 may be suitable. Eight shock isolators 34 may be used in the exemplary embodiment shown in FIG. 2. Fewer than six and more than ten shock isolators 34 may also be suitable in other exemplary applications.

As shown in FIG. 2, the shock isolators 34 may be disposed circumferentially around the lower coupler part 24. The shock isolators 34 may be arranged in any suitable pattern. In an exemplary arrangement, the shock isolators 34 may be arranged in an ordered pattern in which the shock isolators 34 are uniformly spaced and have a same radial distance to a center of the vibration testing unit 20. Although the vibration testing unit 20 is shown as being cylindrical in shape, the shock isolators 34 may be implemented in a vibration testing unit with coupler parts having any other shape. Accordingly, the pattern of the shock isolators 34 may vary depending on the size and shape of the vibration testing unit and the automated coupler parts 22, 24.

Figure 3:
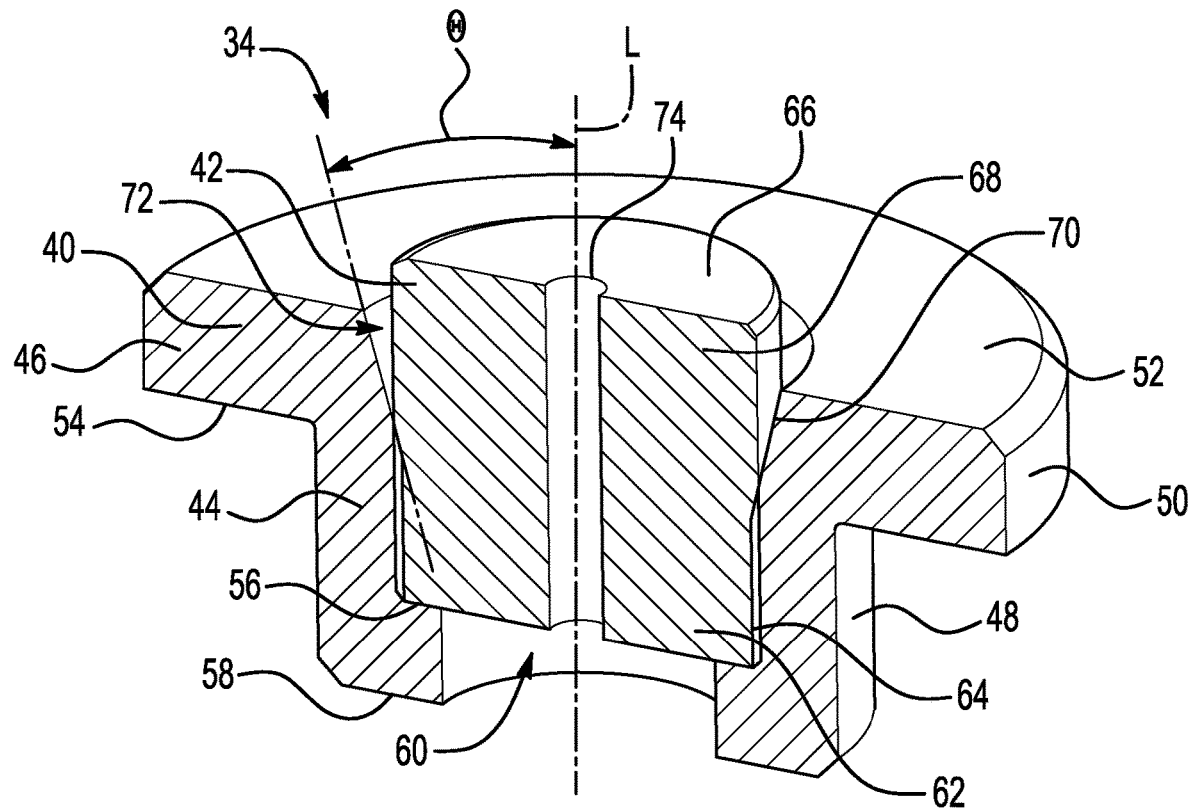
FIG. 3 shows an oblique sectional view of the isolator of FIG. 1 including a bushing and a compressive fit rod press-fit into the bushing.
Figure 4:
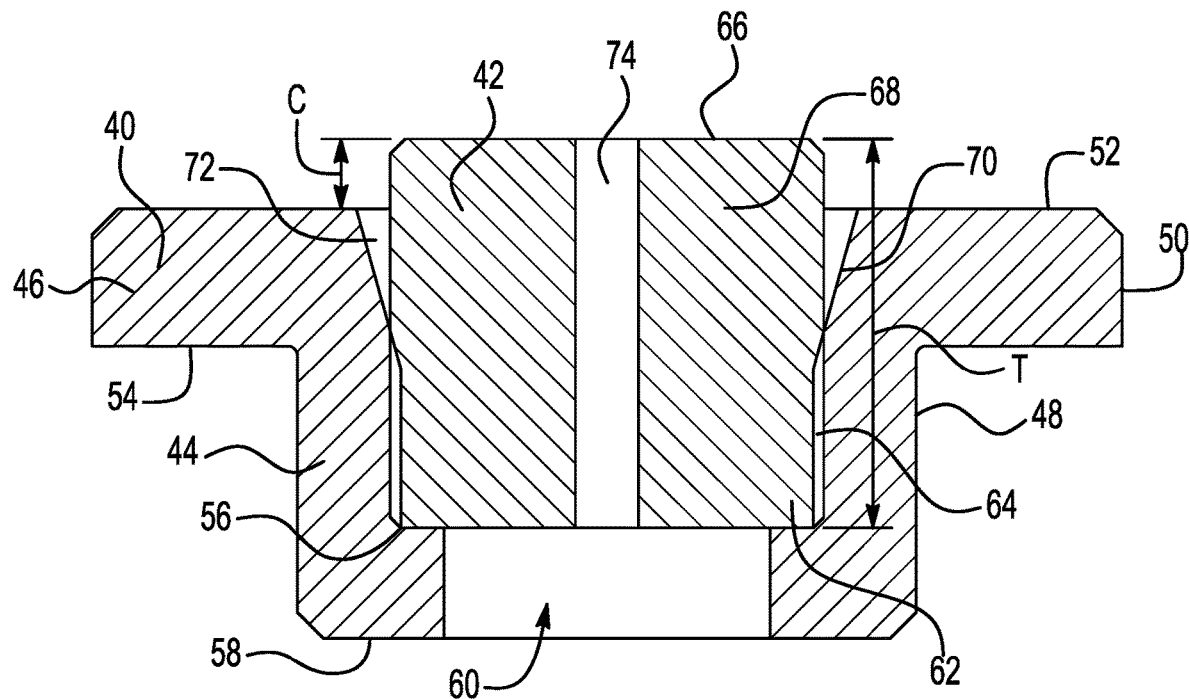
FIG. 4 shows a front sectional view of the isolator of FIG. 1.

Referring in addition to FIGS. 3 and 4, details of the shock isolator 34 are shown. The shock isolator 34 includes a bushing 40 and a compressive fit rod 42 that is inserted to be arranged in the bushing 40. The bushing 40 has a main body 44 and a flange 46 that is integrally formed with the main body 44. The flange 46 may be disc-shaped and extends radially outwardly relative to the main body 44. The main body 44 may have a longer axial length than the flange 46. The main body 44 may be cylindrical in shape and has an outer surface 48 that defines a smaller relative to the diameter of an outer surface 50 of the flange 46. When assembled in the vibration testing unit 20, the flange 46 defines a radially-extending upper surface 52 of the bushing 40. The upper surface 52 forms a radial mating surface that is matingly engageable with the upper coupler part 22, as shown in FIG. 1. A lower surface 54 of the flange 46 that opposes the upper surface 52 matingly engages with the seat 38 formed in the lower coupler part 24 such that the shock isolator 34 is interposed between the upper coupler part 22 and the lower coupler part 24.

The main body 44 has an inner radial surface 56 that extends radially inwardly and forms a radial seat for a corresponding axial end of the compressive fit rod 42. The inner radial surface 56 is formed proximate a lower axial end 58 of the shock isolator 34 that is distally opposite the upper surface 52 of the flange 46 of the bushing 40. The compressive fit rod 42 is received in an axial bore 60 of the bushing 40. The axial bore 60 may be a through-bore that extends through an entire axial length of the bushing 40. The through-bore has a non-uniform diameter along a longitudinal axis L of the shock isolator 34. The longitudinal axis L of each shock isolator 34 may be parallel with the central axis A of the vibration testing unit 20 (shown in FIG. 1). The compressive fit rod 42 is concentrically arranged with the bushing 40 such that the compressive fit rod 42 and the bushing 40 share the common longitudinal axis L. The compressive fit rod 42 may be formed to have any suitable shape. As shown in FIG. 3, a cylindrical shape is a suitable shape, but other shapes may also be suitable for other applications.

The compressive fit rod 42 is press-fit (interference fit) into the bushing 40 and is formed of an elastically deformable material that may be repeatedly deformed and released (expanded). A base portion 62 of the compressive fit rod 42, which forms a lower end of the compressive fit rod 42 that is seated in the bushing 40, has a compressive fit with an interior wall 64 of the main body 44 of the bushing 40 that defines part of the axial bore 60. The compressive fit may be less than ten percent. In exemplary embodiments, the compressive fit may be around five percent. The base portion 62 of the compressive fit rod 42 that engages with the interior wall 64 may constitute approximately half of a volume of the compressive fit rod 42, and an axial length that is approximately half of a total axial length of the compressive fit rod 42 when the compressive fit rod 42 is in an expanded position. The expanded position is shown in FIGS. 3 and 4 and the compressed position is shown in FIG. 1.

The compressive fit rod 42 is expanded to the expanded position shown in FIGS. 3 and 4 when the automated coupler parts 22, 24 are decoupled. The expanded position may be an original or regular shape of the compressive fit rod 42, such that the expanded position corresponds to a state in which the compressive fit rod 42 is relaxed. When the compressive fit rod 42 is in the expanded position, the shock isolator 34 is activated such that an axial end 66 of an upper portion 68 of the compressive fit rod 42 engages with the upper coupler part 22. During decoupling of the automated coupler parts 22, 24, positive pressure is applied to the automated coupler parts 22, 24 such that the upper coupler part 22 may rapidly accelerate upwardly and downwardly against the lower coupler part 24. When the shock isolator 34 is expanded and thus activated, the compressive fit rod 42 of the shock isolator 34 extends outside the bushing 40 and is configured to absorb the excess shock energy generated by the decoupling. Accordingly, the activated shock isolator 34 prevents shock transfer between the automated coupler parts 22, 24 and any damage to the component being vibration tested.

During coupling of the automated coupler parts 22, 24, the shock isolator 34 is disabled such that normal operation of the vibration testing unit 20 occurs and is unaffected by the implementation of the shock isolator 34. When the shock isolator 34 is disabled, the upper portion 68 of the compressive fit rod 42 is deformed inside the bushing 40 by the force of the upper coupler part 22 moving to engage the lower coupler part 24. The upper portion 68 of the compressive fit rod 42 is deformed inside the flange 46 of the bushing 40 such that the entire volume of the compressive fit rod 42 is surrounded by the bushing 40.

The bushing 40 has a chamfer 70 that forms part of the axial bore 60. The chamfer 70 is defined by a tapered surface that extends downwardly and radially inwardly from the upper surface 52 of the flange 46. The chamfer 70 defines a chamfered volume 72 or a space between the bushing 40 and an outer peripheral surface of the compressive fit rod 42. The chamfer 70 is formed to be engaged by the upper portion 68 of the compressive fit rod 42 when the compressive fit rod 42 is compressed inside the bushing 40. When the compressive fit rod 42 is expanded to the expanded position, the compressive fit rod 42 disengages the chamfer 70 and the chamfered volume 72 is emptied to re-form the space between the chamfer 70 and the compressive fit rod 42. The chamfered volume 72 is filled by the compressive fit rod 42 when in the compressed position. The chamfered volume 72 may be entirely filled by the deformed compressive fit rod 42.

The chamfered volume of the bushing 40 may be formed to have any suitable dimensions. The tapered surface may extend an axial distance along the longitudinal axis L that is less than half of an entire axial length of the bushing 40. The tapered surface may extend from the upper surface 52 of the flange 46 to the interior wall 64 of the main body 44. In exemplary embodiments, the tapered surface may be angled by an angle θ that is between ten and 20 degrees relative to the longitudinal axis L. An angle θ of approximately 15 degrees may be suitable. Other angles may be possible depending on the application.

The compressive fit rod 42 is formed of any suitable elastomeric material that is able to be compressed without permanently deforming. When in the compressed position, the compressive fit rod 42 is arranged inside the bushing 40 such that only a portion of the compressive fit rod 42, i.e. a compressible volume, deforms when the compressive fit rod 42 is compressed. The compressible volume corresponds to the chamfered volume of the bushing 40. An axial length C of the compressible volume of the upper portion 68 of the compressive fit rod 42 may be ten percent or less of a total axial length T of the compressive fit rod 42. When the compressive fit rod 42 is in the expanded position, the compressible volume of the upper portion 68 of the compressive fit rod 42 may extend upwardly outside or past the bushing 40 by the axial length C. Accordingly, by compressing only the compressible volume of the compressive fit rod 42, the compression of the compressive fit rod 42 may have a linear profile, as compared with a non-linear compression profile that would result from compressing a larger axial length of the compressive fit rod 42, such as over 50 percent.

The material of the compressive fit rod 42 is temperature resistant such that the material is able to maintain its material properties through hot and cold thermal conditions that may occur during vibration testing. The material may have a durometer that is medium hard, or a durometer that is in a Shore A hardness range of 40 to 70. For example, a durometer of 40 or 60 may be suitable. The durometer may be dependent on the application. Examples of suitable materials include urethane, such as polyurethane, but other elastomeric materials having similar properties to polyurethane may be suitable. Other rubber materials or synthetic materials that are able to provide repeatability and withstand the various range of thermal conditions may be suitable.

The bushing 40 may be formed of any suitable material that is temperature resistant and able to withstand hot and cold thermal conditions. Suitable materials include thermoplastic polymer materials. Polyamide (nylon) is an example of a suitable material. Other materials having similar properties to polyamide may be suitable. Many other materials may be suitable and the materials may be dependent on the application.

The compressive fit rod 42 has a solid shape with an axially-extending through-aperture 74 that extends along the longitudinal axis L through the entire axial length T of the compressive fit rod 42. The axially-extending through-aperture 74 enables the compressive fit rod 42 to return to the expanded position during decoupling. Without the axially-extending through aperture, a vacuum condition would occur that would prevent the compressive fit rod 42 from being released from the compressed position to the expanded position. The axially-extending through-aperture may have any suitable diameter, such as a diameter that is less than 25 percent of the diameter of the compressive fit rod 42.

Figure 5:
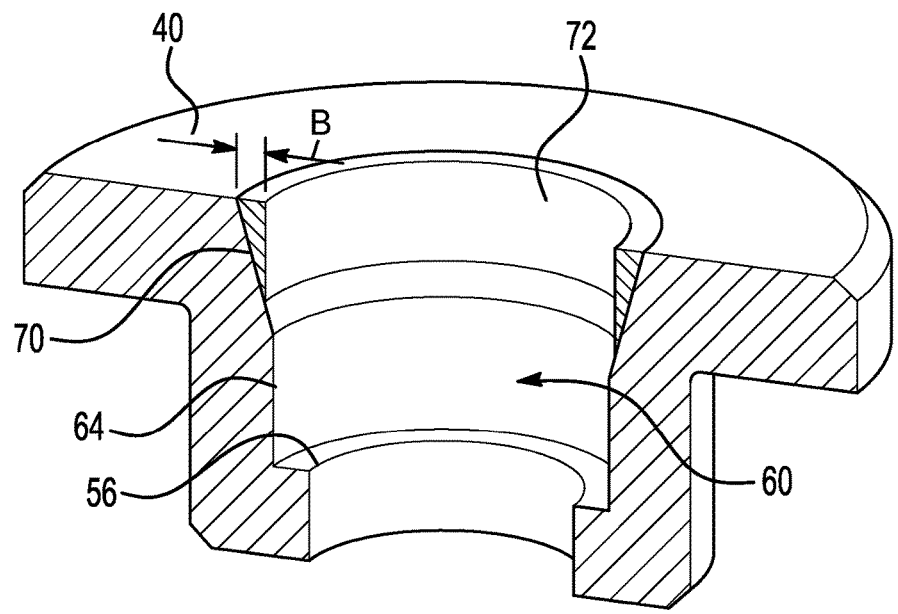
FIG. 5 shows a sectional view of the bushing of FIG. 3.
Figure 6:
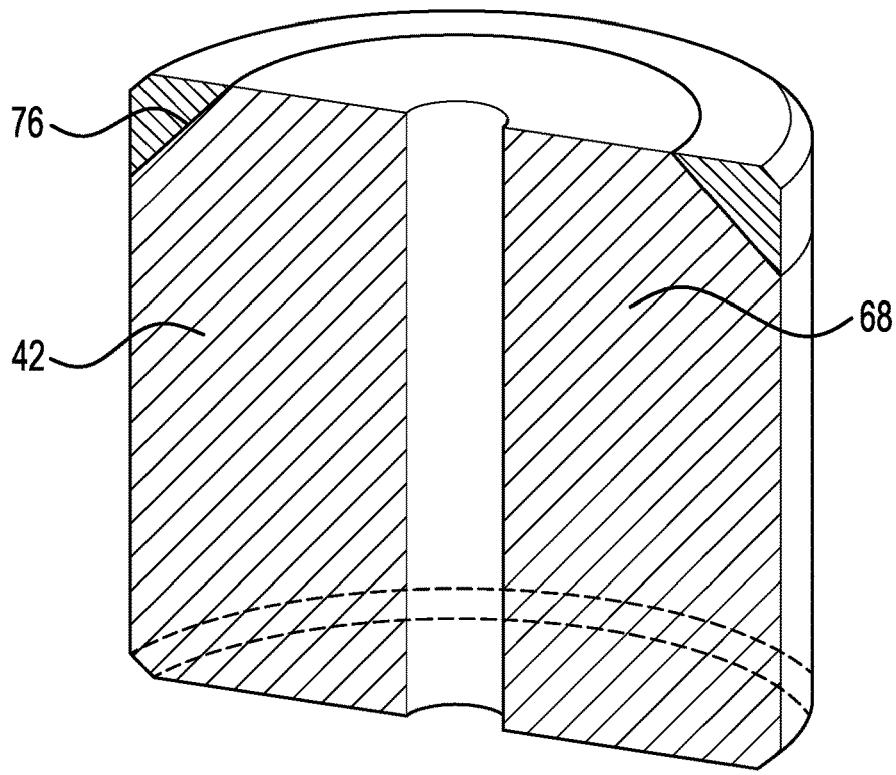
FIG. 6 shows a sectional view of the compressive fit rod of FIG. 3.

Referring now to FIGS. 5 and 6, further details of the inside of the bushing 40 and the compressive fit rod 42 are shown. FIG. 5 shows the axial bore 60 of the bushing 40, as defined by the interior wall 64, with which the compressive fit rod 42 has a press-fit or interference fit, and which extends upwardly from the inner radial surface 56. The interior wall 64 extends to the tapered wall forming the chamfer 70 which defines another part of the axial port 60. FIG. 5 also shows the chamfered volume 72 defined by the chamfer 70. In an exemplary embodiment, the chamfered volume 72 may be between 0.049 cubic centimeters (0.003 cubic inches) and 0.082 cubic centimeters (0.005 cubic inches). Many other dimensions and shapes are suitable and may be dependent on the application.

As shown in FIG. 6, the upper portion 68 of the compressive fit rod 42 has a compressible volume 76 that is approximately equivalent to the chamfered volume 72. In an exemplary embodiment, the chamfered volume 72 is offset by between one and three millimeters, such as two millimeters. Accordingly, when the compressive fit rod 42 is in the expanded position within the bushing 40, the compressive fit rod 42 is offset from the chamfer 70 by between one and three millimeters, such as two millimeters. The dimensions shown are merely exemplary and the shock isolator 34 may be sized up or down depending on the application.

Figure 7:
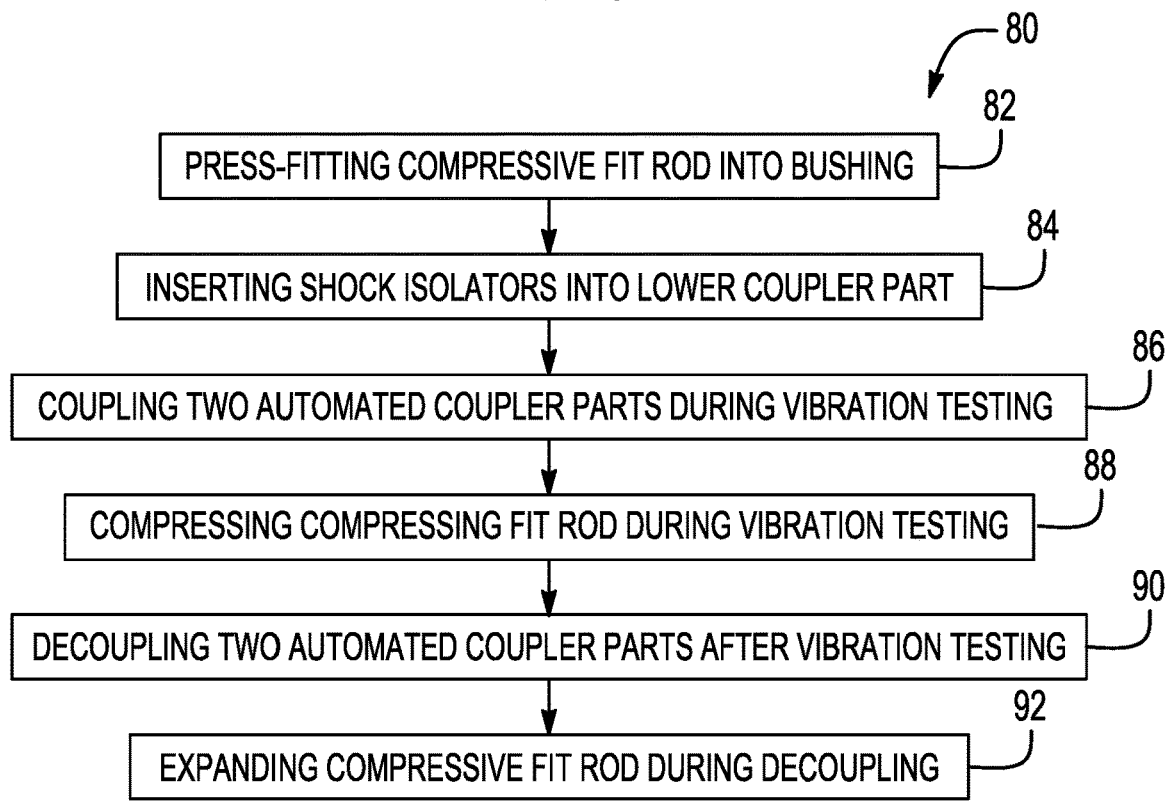
FIG. 7 shows a method of vibration testing using a vibration testing unit, such as the vibration testing unit including the shock isolators of FIG. 1.

Referring now to FIG. 7, a method 80 of vibration testing using the vibration testing unit 20 of FIGS. 1-4 to test a component is shown. Step 82 of the method 80 includes press-fitting a compressive fit rod 42 into a bushing 40 to form a shock isolator 34 (shown in FIG. 3). More than one shock isolator 34 may be formed. Step 84 of the method 80 includes inserting one or more shock isolators 34 into a lower coupler part 24 of two automated coupler parts 22, 24, between the lower coupler part 24 and an upper coupler part 22 of the two automated coupler parts 22, 24 (shown in FIG. 1).

Step 86 of the method 80 includes coupling the two automated coupler parts 22, 24 during vibration testing of a component. Step 88 of the method 80 includes compressing an upper portion 68 of the compressive fit rod 42 inside the bushing 40 to disable the one or more shock isolators 34 during the vibration testing and enable normal operation of the vibration testing. The compressive fit rod 42 is compressed by the engagement of the upper coupling part 22 against the lower coupling part 24. Step 88 includes filling a chamfered volume 72 formed in an upper portion of the bushing 40 with a compressible volume 76 of the compressive fit rod 42 (shown in FIGS. 5 and 6). Step 88 may further include compressing the compressible volume 76 of the compressive fit rod 42 that has an axial length that is ten percent or less of a total axial length of the compressive fit rod 42.

Step 90 of the method 80 includes decoupling the two automated coupler parts 22, 24 after the vibration testing. Step 92 of the method 80 includes expanding the upper portion 68 of the compressive fit rod 42 upwardly from and outside the bushing 40 to activate the one or more shock isolators 34 and prevent shock transfer between the two automated coupler parts 22, 24 when the two automated coupler parts 22, 24 are decoupled, such that damage to the test component is prevented. Step 92 includes releasing or removing the compressible volume 76 of the compressive fit rod 42 from the chamfered volume 72 by way of the upper coupling part 22 disengaging from the lower coupling part 24. When the shock isolators 34 are installed in the vibration testing unit 20, the steps 86-92 of the method 80 may be repeated, such that the compressive fit rod 42 is repeatedly compressible and expandable during vibration testing.

Although the disclosure shows and describes certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A vibration testing unit comprising:
an automated coupler having an upper coupler part and a lower coupler part that are engaged during vibration testing and disengaged after the vibration testing; and
a plurality of shock isolators arranged in the lower coupler part between the upper coupler part and the lower coupler part, each of the plurality of shock isolators including:
a bushing; and
a compressive fit rod supported in the bushing, the compressive fit rod being compressible to a compressed position in which the compressive fit rod is compressed inside the bushing to disable the plurality of shock isolators when the upper coupler part and the lower coupler part are engaged during vibration testing, the compressive fit rod being expandable to an expanded position in which the compressive fit rod expands outwardly from the bushing to activate the plurality of shock isolators and absorb excess shock energy when the upper coupler part and the lower coupler part are disengaged.

2. The vibration testing unit according to claim 1, wherein, for each of the shock isolators:
the bushing has a tapered surface that defines a chamfered volume;
the compressive fit rod has a compressible volume that is equivalent to the chamfered volume; and
the chamfered volume is filled by the compressive fit rod when the compressive fit rod is deformed during compression.

3. The vibration testing unit according to claim 2, wherein, for each of the shock isolators:
the tapered surface that tapers radially inwardly from a radial mating surface of the bushing, to a cylindrical inner surface of the bushing that extends down to inner radial surface of the bushing that functions as a radial seat for supporting the compressive fit rod; and
the radial mating surface is an upper surface of the bushing that engages an upper coupler part of the automated coupler parts.

4. The vibration testing unit according to claim 2, wherein, for each of the shock isolators, the tapered surface extends an axial distance that is less than half of an entire axial length of the bushing.

5. The vibration testing unit according to claim 2, wherein, for each of the shock isolators, the tapered surface is angled by between 10 and 20 degrees relative to a longitudinal axis of the shock isolator.

6. The vibration testing unit according to claim 2, wherein, for each of the shock isolators:
the compressive fit rod has a compressible volume that is deformed during compression; and
the compressible fit rod deforms ten percent or less of a total axial length of the compressive fit rod to produce the compressible volume that fills the chamfered volume.

7. The vibration testing unit according to claim 6, wherein, for each of the shock isolators, the compressible volume is an uppermost portion of the compressive fit rod.

8. The vibration testing unit according to claim 1, wherein, for each of the shock isolators, the compressive fit rod is press-fit into the bushing.

9. The vibration testing unit according to claim 1, wherein, for each of the shock isolators, the compressive fit rod defines an axially-extending through-aperture.

10. The vibration testing unit according to claim 1, wherein, for each of the shock isolators, an upper portion of the compressive fit rod is compressed inside an upper portion of the bushing when in a compressed position, and wherein the upper portion expands upwardly and outside of the bushing to an expanded position which corresponds to a normal shape of the compressive fit rod.

11. The vibration testing unit according to claim 1, wherein the compressible rod for each of the shock isolators is formed of an elastically deformable material.

12. The vibration testing unit according to claim 1, wherein the shock isolators are circumferentially spaced around a central axis of the vibration testing unit.

13. The vibration testing unit according to claim 12, wherein the upper coupler part and the lower coupler part define an interior area therebetween, arranged along the central axis of the vibration testing unit.

14. The vibration testing unit according to claim 13, wherein the interior area is configured for receiving a component to be tested.

15. The vibration testing unit according to claim 14, wherein the vibration testing unit further comprises fasteners or other support mechanisms within the interior area, configured to support the component to be tested.

16. The vibration testing unit according to claim 12, wherein there are between six and ten of the shock isolators in the vibration testing unit.

17. A method of vibration testing, the method comprising:
press-fitting a compressive fit rod into a bushing to form a shock isolator;
inserting one or more shock isolators into a lower coupler part of two automated coupler parts between the lower coupler part and an upper coupler part of the two automated coupler parts;
engaging the two automated coupler parts during vibration testing and disengaging the two automated coupler parts after the vibration testing;
compressing an upper portion of the compressive fit rod inside the bushing to disable the one or more shock isolators during the vibration testing; and
expanding the upper portion of the compressive fit rod upwardly from and outside the bushing to activate the one or more shock isolators and absorb excess shock energy when the two automated coupler parts are disengaged.

18. The method according to claim 17, wherein compressing the upper portion of the compressive fit rod includes filling a chamfered volume formed in an upper portion of the bushing and expanding the upper portion of the compressive fit rod includes removing the compressive fit rod from the chamfered volume.

19. The method according to claim 17, wherein compressing the upper portion of the compressive fit rod includes compressing a compressible volume of the compressive fit rod that has an axial length of the compressive fit rod that is ten percent or less of a total axial length of the compressive fit rod.

* * * * *